(12) United States Patent
Ciecko

(10) Patent No.: US 6,186,119 B1
(45) Date of Patent: Feb. 13, 2001

(54) DEVICE DISPENSING FUEL FOR SUPPLYING AN INTERNAL COMBUSTION ENGINE CYLINDER

(75) Inventor: Daniel Ciecko, Brie-Comte-Robert (FR)

(73) Assignee: CIDEB, Fontenay (FR)

( * ) Notice: Under 35 U.S.C. 154(b), the term of this patent shall be extended for 0 days.

(21) Appl. No.: 09/254,475

(22) PCT Filed: Oct. 22, 1997

(86) PCT No.: PCT/FR97/01887

§ 371 Date: Mar. 5, 1999

§ 102(e) Date: Mar. 5, 1999

(87) PCT Pub. No.: WO99/02850

PCT Pub. Date: Jan. 21, 1999

(30) Foreign Application Priority Data

Jul. 9, 1997 (FR) .................................................. 97 08713

(51) Int. Cl.[7] .................................................. F02M 33/04
(52) U.S. Cl. .................................................. 123/456
(58) Field of Search .................................. 123/456, 468, 123/469, 470, 458

(56) References Cited

U.S. PATENT DOCUMENTS

| | | | |
|---|---|---|---|
| 2,892,453 | * | 6/1959 | Stoll ..................................... 123/456 |
| 5,109,822 | * | 5/1992 | Martin ................................. 123/456 |
| 5,186,147 | * | 2/1993 | Bellis ................................. 123/457 |

FOREIGN PATENT DOCUMENTS

| | | |
|---|---|---|
| 38 17 413 | 12/1988 | (DE) . |
| 196 07 521 | 4/1997 | (DE) . |
| 266 269 | 5/1988 | (EP) . |
| 427 977 | 5/1991 | (EP) . |

* cited by examiner

Primary Examiner—Thomas N. Moulis
(74) Attorney, Agent, or Firm—Browdy and Neimark

(57) ABSTRACT

The invention concerns a light and compact dispensing device comprising a hollow body with a substantially spherical cavity (17), consisting of an assembly of two soldered elements (15, 16) and comprising accesses (14) each constituted by a hole with small cross-section (38) and a tapped hole (40) connected to the hole with small cross-section through a tapered shaft 41.

23 Claims, 3 Drawing Sheets

DEVICE DISPENSING FUEL FOR SUPPLYING AN INTERNAL COMBUSTION ENGINE CYLINDER

The invention concerns a fuel distribution device for feeding the cylinders of an internal combustion engine, in particular an engine with fuel injection at a relatively high pressure.

The invention is more particularly concerned with a new construction of a device of the above kind well able to withstand injection pressure but low in cost, easy to manufacture and easy to install.

In a fuel injected internal combustion engine the fuel distributor conventionally includes a generally tubular body connected at one axial end to the outlet of a fuel pump and having along its length a plurality of outlets in projecting bosses, these outlets being connected to the various cylinders and possibly to other devices such as a regulator, a damper, etc.

The internal orifices of the various outlets must be free of burrs and swarf. In practice this requires particularly careful finish machining of the inside wall of the distributor. The bosses are externally attached by means of shrunk-fit rings, which is a costly technique. Otherwise a costly one-piece component must be made.

A tubular body of the above kind also has a plurality of supports or fixing lugs for fixing it along the engine. The varied shapes of distributors of the above kind and the necessity to fit them at a number of points means that in practice it is necessary to design a specific model for each type of engine.

The axial ends of the tubular part are closed by screwthreaded plugs which have poor resistance to pressure.

The invention avoids all the above drawbacks.

To be more precise, the invention concerns a fuel distribution device for feeding the cylinders of a fuel-injected internal combustion engine, of the type having a hollow body with ports formed in its wall adapted to be connected, in particular, to a supply of fuel under pressure and to a plurality of injectors respectively feeding said cylinder, characterized in that said hollow body comprises at least two components welded together to define a substantially spherical cavity between them and in that each port comprises a substantially radially oriented small section hole and a larger diameter screwthreaded hole opening to the outside and connected to said small section hole.

"Port" means any connection to the distributor, whether a fuel inlet or an outlet connected to a cylinder of the engine or a connection to a regulator or damper.

The two components can be brazed or welded together. They define a substantially spherical cavity. These components can be made of steel or any other metal suitable for the required operating conditions.

In one embodiment the ports (or most of them) can be defined on a ring attached to the outside surface of one of the components.

In another embodiment at least one of the aforementioned ports is defined in an end-piece welded or otherwise attached to the outside of one or other of the aforementioned two components, the end-piece being attached in such fashion that said port communicates with the corresponding hole formed in the wall of said component.

In one embodiment the inside wall of a first of the aforementioned components forms a first spherical dome extended by a cylindrical sleeve that is open prior to assembly. A second of the aforementioned components includes a cylindrical part forming a plug engaged in said sleeve after assembly and having a cup forming a second spherical dome complementary to the first. The second component forms a mounting base on the engine and the base has an annular flange projecting externally relative to the cylindrical plug engaged in the other component. This flange is welded or brazed to a corresponding flat annular area of the first component around the opening of the sleeve.

Also, an annular cavity is formed between the two components in the vicinity of the weld area to recover particles of material resulting from the welding operation and thereby prevent intrusion of material into the interior spherical cavity.

The ports can all be in one of the components, in this instance the first component.

The internal orifices of the small section holes that discharge into the interior of the cavity can readily be deburred and burnished before welding, the inside wall of said first cavity being readily accessible to machining tools via the cylindrical sleeve.

The invention will be better understood and other advantages of the invention will become more clearly apparent on reading the following description of several embodiments of a distributor device in accordance with the invention given by way of example only and with reference to the accompanying non-limiting drawings, in which:

FIGS. 1 and 2 show a fuel distribution device 11 for feeding the cylinders of an internal combustion engine, in particular a fuel injected engine.

In an engine of this type, not shown, the fuel is delivered to the device 11 by a pump at a relatively high pressure, in the order of 120 bars for a petrol engine, and is distributed to injectors controlled by solenoid valves.

The fuel is maintained under pressure at all times in the device of the invention and the solenoid valves associated with the injectors control their opening at given times in the operating cycle of the engine and for a varying duration that determines the quantity of fuel injected.

To this end the distributor device essentially comprises a hollow body 12, which here has a spherical internal configuration and carries a certain number of ports 14 adapted to be connected, in particular, to a supply of fuel under pressure, i.e. the pump, and to a plurality of injectors feeding respective cylinders of the engine.

Other ports 14 can be reserved for connecting control means such as, for example, a regulator and/or a damper and/or a pressure offtake. Accordingly, in the example shown, which has eight ports, one of them is adapted to be connected to the outlet of a pump, six others are adapted to be connected to respective injectors of a six-cylinder petrol engine and the last is adapted to be connected to a regulator, for example.

In this example, all the ports 14 are structurally identical.

Figure 1:
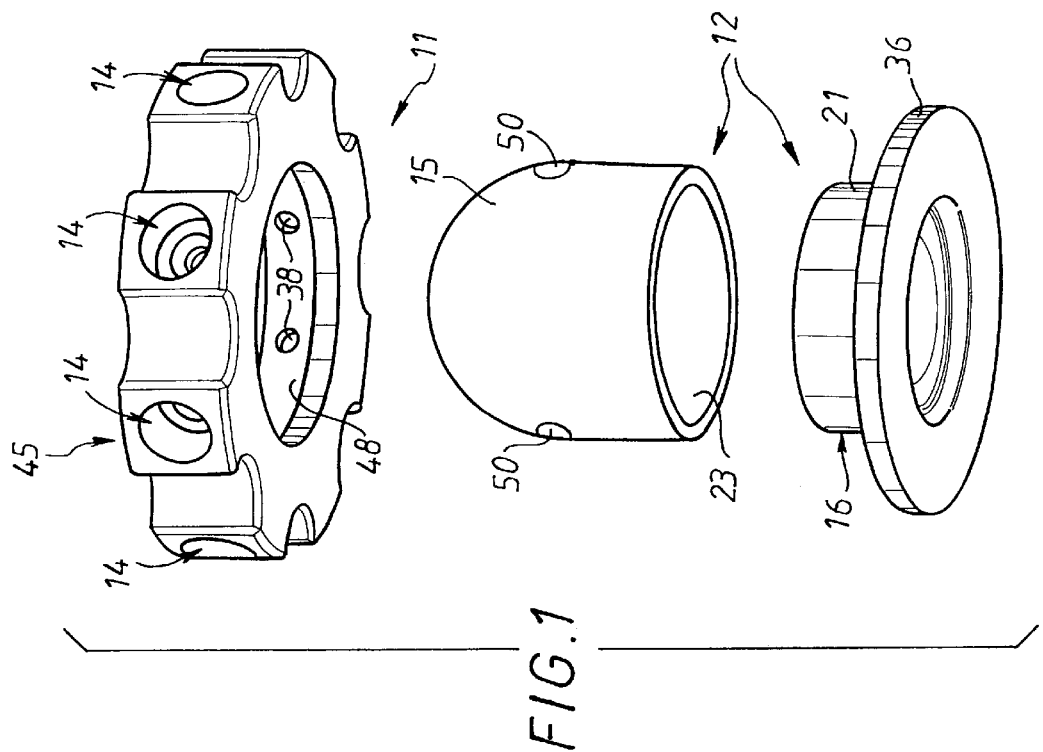
FIG. 1 is an exploded perspective view of the principal components of a distributor device in accordance with the invention.

The hollow body 12 is an assembly of two components 15, 16 welded together and defining a spherical cavity 17 between them. The inside wall of the first component 15 forms a first spherical dome 22 extended by a cylindrical sleeve 23 that is open before assembly (FIG. 1). The second component 16 includes a cylindrical plug 21 having an outside diameter corresponding to the inside diameter of the sleeve 23. It is engaged in the sleeve after assembly and has a cup at its inside end. The cup forms a second spherical dome 28 complementary to the first spherical dome 22 so that after the two components 15 and 16 are assembled and welded together the cavity defined inside the distributor device is spherical. This spherical shape offers great resistance to pressure. Because of this, the walls of the two components are relatively thin, other things being equal. The interior volume of the cavity can be adjusted to the required value for the capacity of the engine. The exterior volume of the device varies little with the engine capacity. The second component 16 includes a mounting base 36 enabling the distributor device to be fixed at a single point to the engine or the pump. The base forms an annular flange which can include holes for fixing the device, for example. Here the two components 15, 16 are made of steel. They are preferably brazed together. They could also be made of aluminum or aluminum alloy.

In one embodiment the ports 14 are welded or brazed to the outside of at least one of the two components, here the first component 15.

Each port comprises a substantially radially oriented small section hole 38 communicating with the interior of the cavity and a larger diameter screwthreaded hole 40 discharging on the outside and connected to said small section hole.

In the example the ports 14 (or at least two of them) are defined on a ring 45 attached to the outside surface of one of the components. In the example the ring is brazed or otherwise welded to the outside surface of said first component 15. For each port the screwthreaded hole 40 and the small section hole 38 are coaxial and aligned with each other and they are joined together by a conical bearing surface 41. The conical bearing surface could be replaced with a flat bearing surface.

The ports discharge into an annular groove 48 on the inside face of the ring 45. This groove communicates with holes 50 through said first component 15.

There are two oblong and diametrally opposed holes 50. When the ring is welded to said first component its median plane is substantially coincident with an equatorial plane of the cavity. The annular groove 48 defines with the outside surface of the first component 15 an annular distribution pipe establishing communication between the small section pipes 38 of the various ports and the two oblong holes 50 in the wall of the first component.

Figure 2:
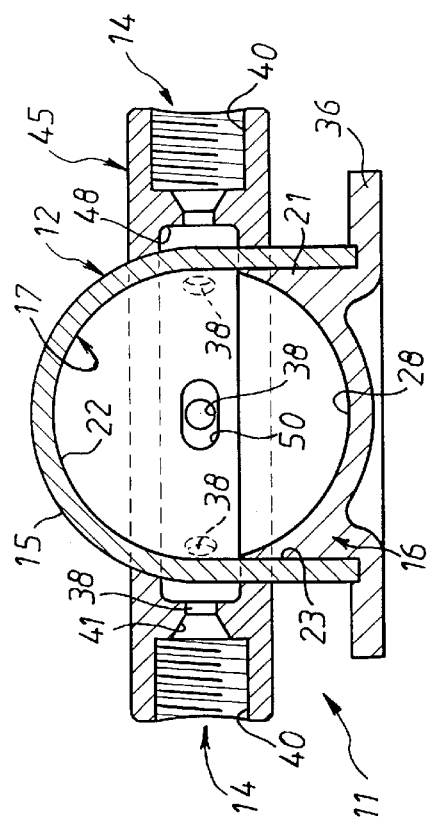
FIG. 2 is a sectional view in elevation of the device from FIG. 1, showing the components assembled together.
Figure 3:
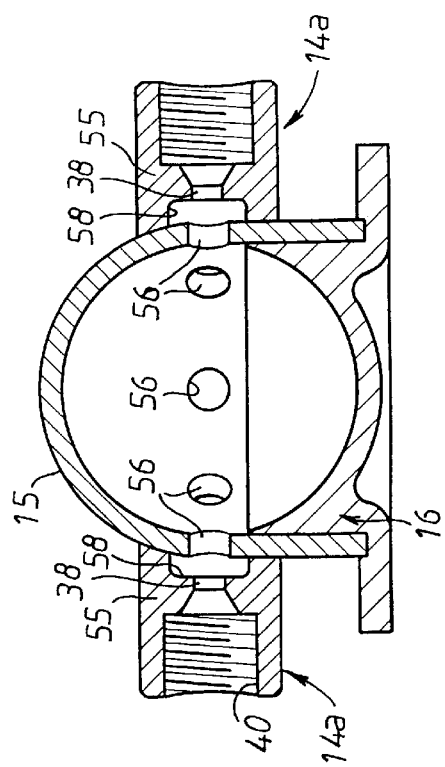
FIG. 3 is a sectional view in elevation of another embodiment of a distributor device in accordance with the invention.

In the FIG. 3 variant, on the other hand, each port 14a is defined in an end-piece welded to the outside of one or other of the aforementioned two components. In one variant only some of the ports are of this kind. An end-piece of the above kind is attached so that said port communicates radially with a corresponding hole 56 in the wall of the component 15 to which it is welded. Said end-pieces are preferably fixed by brazing.

The small section hole 38 of each port opens into a recess 58 at the end of the end-piece 55 welded to the component 15.

Figure 4:
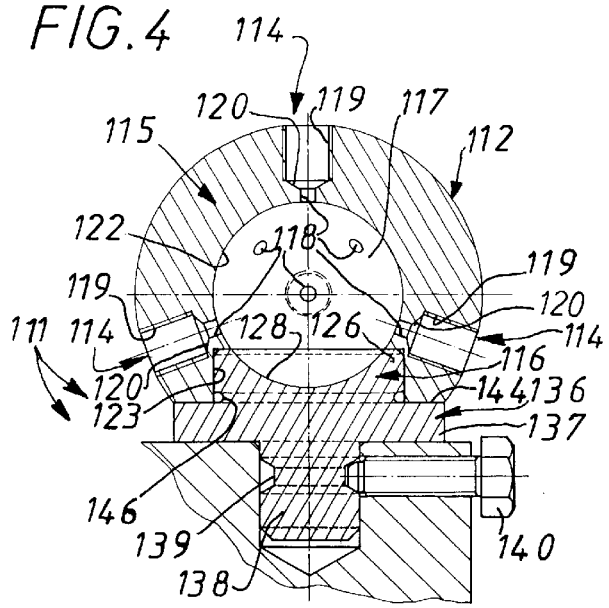
FIG. 4 is a sectional view in elevation of another embodiment of a fuel distribution device in accordance with the invention, taken along the section line IV—IV in FIG. 5.
Figure 5:
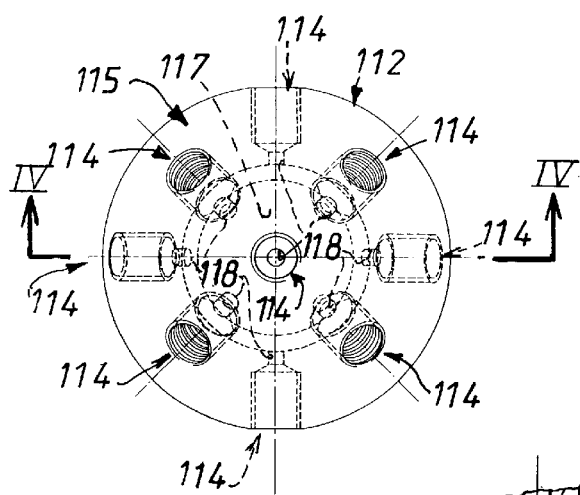
FIG. 5 is a top view of FIG. 4.

FIGS. 4 and 5 show another fuel distribution device 111 for supplying the cylinders of an internal combustion engine, for example a high-pressure fuel injected diesel or petrol engine. In this type of engine, not shown, the fuel is delivered to the device 111 by a pump at a high pressure (in the order of 1 400 bars to 2 000 bars for a diesel engine or 100 bars to 150 bars for a petrol engine) and is distributed to injectors controlled by solenoid valves.

The distributor device essentially comprises a hollow body 112 in the wall of which are ports 114 adapted to be connected, in particular, to a supply of fuel under pressure (pump) and to a plurality of injectors feeding respective cylinders of the engine. Other ports 114 can be reserved to connecting control means such as, for example, a regulator and/or a damper and/or a pressure offtake.

In the example of FIGS. 4 and 5, which has nine ports, one is adapted to be connected to the outlet of a pump, six others are adapted to be connected to respective injectors of a six-cylinder diesel engine and two others are adapted to be connected to a regulator and to a damper, respectively. In the example all the ports 114 are structurally identical.

The hollow body 112 is an assembly of at least two components 115, 116 welded together and defining a cavity 117 between them. The cavity is advantageously at least substantially spherical and preferably spherical. What is more, as shown here, each port comprises a radially oriented small section hole 118 opening into the interior of the cavity 117 and a larger diameter screwthreaded hole 119 opening to the outside and connected to said small section hole, here by a conical bearing surface 120, axially aligned with the screwthreaded hole 119.

In the example all the ports 114 are radial ports. To be more precise, the inside wall of a first component 115 forms a first spherical dome 122 extended by a cylindrical sleeve 123 which is open before assembly and a second component 116 includes a cylindrical plug 121 having an outside diameter corresponding to the inside diameter of the sleeve 123, engaged in said sleeve assembly and having a cup at its innermost end. The cup forms a second spherical dome 128 complementary to the first one so that, after the two components 115, 116 described hereinabove are assembled and welded together, the internal cavity defined inside the distributor device is spherical.

The two components 115, 116 can be made of steel but are preferably made of aluminum or aluminum alloy, which yields a much lighter distributor device, other things being equal, and avoids the necessity for anti-corrosion treatment. The spherical shape of the cavity offers high resistance to pressure. The interior volume of the cavity can be adjusted to the value required to suit the engine capacity. The exterior volume of the device varies little with the engine capacity.

Figure 8:
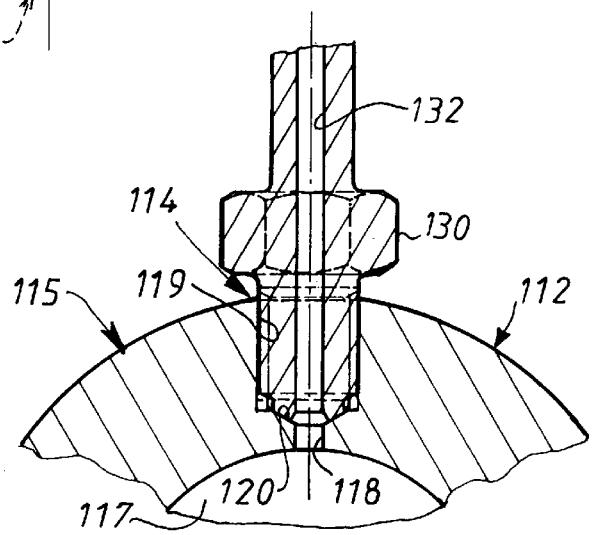
FIG. 8 is a detail sectional view showing the mounting of a connecting member in one of the ports of the distributor device.

As shown in FIG. 8, a connecting member 130 with an external screwthread is fixed by this thread into the screwthreaded hole 119 of the corresponding port. It has an axial passage 132 the same diameter as said small section hole 118 and which opens into the cavity. It has a conical end which is pressed against and sealed to the conical bearing surface 120 defined between said screwthreaded hole 119 and said small section hole 118. The passage 132 and the hole 118 are therefore aligned. The fact that the ports open into the interior of the cavity through small diameter holes (less than 3 mm in diameter, in practice) makes the system highly resistant to pressure. Performance is further improved if the orifices are burnished by means of an appropriate shape tool, for example a spherical surface tool, work hardening the edge of each orifice as necessary.

Moreover, as shown here, the second component 114 includes a mounting base 136 enabling the distributor device to be fixed to one point on the motor or the pump.

In the example shown, the base includes a circular contour base 137 extended axially by a cylindrical member 138 which has a clamping groove 139 for fixing the device by means of a single screw 140.

The base forms an annular flange projecting externally relative to the cylindrical plug and welded to a corresponding flat annular area on the first component defined all around the opening of the sleeve 123. The weld is effected with filler metal, for example by friction or electrical contact welding or electron beam welding. The weld area 144 is shown in the drawings. An annular recess 146 is formed between the two components in the vicinity of the weld area. This recess constitutes a receptacle for receiving and retaining excess material after the welding operation, preventing any of this material reaching the spherical cavity 117.

In the example, the annular recess 146 is defined by an annular groove in the cylindrical plug 126 of said second component 116 near the flange of the base.

The two components are formed by die-stamping a blank if they are made of aluminum or aluminum alloy or forged or extruded if they are made of steel.

In each case the internal part of the first component can easily be machined precisely to determine the volume of the cavity, to suit the engine capacity, and burrs at the orifices of the small diameter holes can easily be removed before welding. In this way the two components 115, 116 are perfectly clean internally and free of swarf before they are assembled by welding them together.

In the example from FIGS. 4 and 5 with a large number of ports, the ports are advantageously distributed over at least the greater part of the first component 115. All the ports are radial ports and open into the first spherical dome 122; they are substantially equidistant, as seen in FIG. 5.

Figure 6:
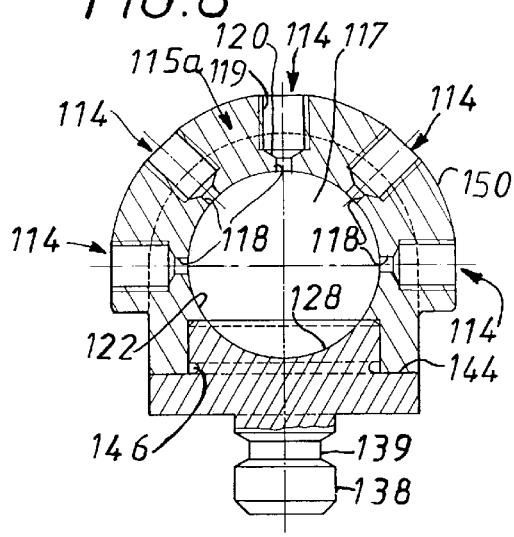
FIG. 6 is a sectional view in elevation of another embodiment of a fuel distribution device in accordance with the invention taken along the section line VI—VI in FIG. 7.
Figure 7:
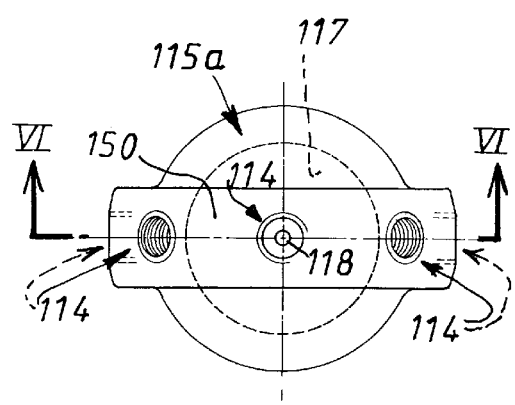
FIG. 7 is a top view of the device from FIG. 6.

The embodiment shown in FIGS. 6 and 7 (in which analogous structural components carry the same reference numbers as in FIGS. 4 and 5) is more particularly suited to an engine requiring only a limited number of ports, for example a four-cylinder engine. In this case the ports 114 are distributed substantially regularly along an arcuate increased thickness portion 150 of said first component.

In this example the median plane of the increased thickness portion 150 is perpendicular to the base 137. It contains the center of the spherical cavity 117.

The increased thickness is calculated in accordance with the wall thickness needed to provide ports 114 having a screwthread of appropriate length. In other words, everywhere else, the wall thickness of said first component 115a is small, to lighten the device. Each radially oriented port 114 comprises a small section hole 118 and a screwthreaded hole 119 aligned with it. If necessary the ports can be distributed along more than one arc of this type.

Figure 9:
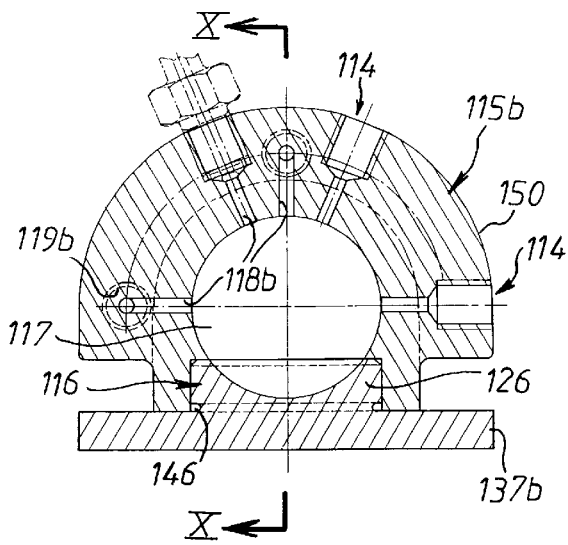
FIG. 9 is a view analogous to FIG. 6 showing another variant in section taken along the line IX—IX in FIG. 10.
Figure 10:
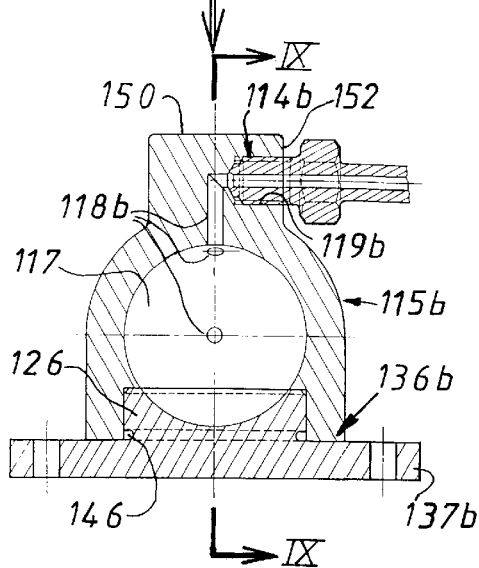
FIG. 10 is a view in section taken along the line X—X in FIG. 9.
Figure 11:
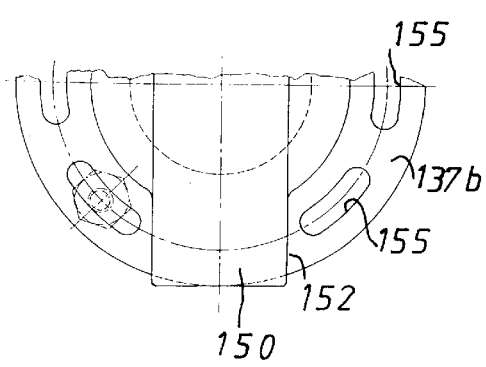
FIG. 11 is a partial view in the direction of the arrow XI in FIG. 10.

FIGS. 9 to 11 show another variant in which, as in the previous embodiment, said first component 115b has an arcuate increased thickness portion 150 in which the ports are formed. As previously, some ports 114 are entirely radial. On the other hand, other ports 114b each comprise a radially oriented small section hole 118b and a screwthreaded hole 119b perpendicular thereto and opening onto a flat annular lateral face 152 of said arcuate increased thickness portion 150, the conical bearing surface 120 extending the screwthreaded hole 119b. This increases the number of ports on the ring, other things being equal.

What is more, depending on the intended mounting on the engine, the ports 114 or 114b can be adapted for easier connection. In this version the mounting base 136b of the second component includes a circular contour base 137b the diameter of which is greater than the outside diameter of the cylindrical part of the first component that caps the plug 126. Circular arc shape slots 155 are formed in the resulting outside flange of the base for fixing the device to the engine, with the facility to orient it in accordance with layout constraints. As previously, the median plane of the arcuate increased thickness portion 150 is perpendicular to the base 137b and contains the center of gravity.

Figure 12:
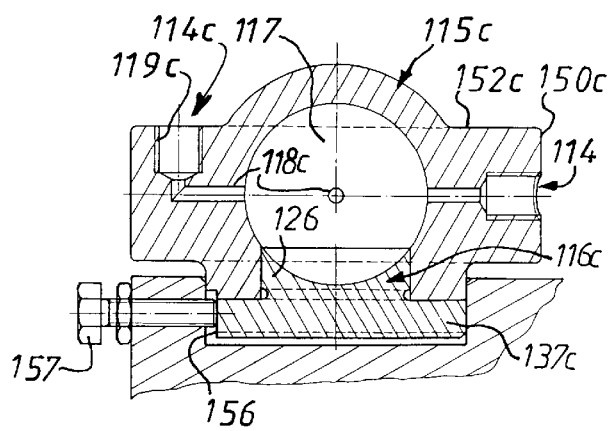
FIG. 12 is a view analogous to FIG. 4 showing another variant.

In the FIG. 12 embodiment said first component 115c also includes an increased thickness portion 150c in which the ports are formed. However, this increased thickness portion forms a complete ring. The median plane of this ring is parallel to the base 137c of the base. Certain ports 114 are entirely radial within this ring. Other ports 114c each include a radially oriented small section hole 118c and a screwthreaded hole 119c perpendicular thereto and opening onto an annular lateral face 152c of the ring-shape increased thickness portion 150c. The hole 119c is extended by a frustoconical bearing surface.

In this variant the device is small in height. The base 137b has the same diameter as the cylindrical part of the first component 115c which caps the plug 126. Fixing is by means of a single hole of corresponding diameter in the engine or pump. A flat 156 is formed on the side of the assembly. The device can therefore be immobilized in the single hole in the engine or pump by means of a single screw 157.

Of course, any of the fixing arrangements envisaged hereinabove can be adopted for any embodiment of the distributor device.

What is claimed is:

1. A fuel distribution device for feeding a plurality of cylinders of a fuel-injected internal combustion engine, said device having a hollow body with a plurality of ports (14, 114) formed in its wall adapted to be connected to a supply of fuel under pressure and to a plurality of injectors feeding the respective plurality of cylinders, said hollow body comprising at least two components (15, 16–115, 116) assembled together to define a cavity (17, 117) between them, wherein the cavity is at least substantially spherical and each of the plurality of ports comprises a substantially radially oriented small section hole (38, 118) and a larger diameter screwthreaded hole (40, 119) opening to the outside and connected to said small section hole, and wherein the plurality of ports are welded to the exterior of at least one of the two components, and each port comprises one of the small section holes (38, 118) communicating with the interior of said cavity.

2. Device according to claim 1 characterized in that at least some ports are defined on a ring (45) attached to the outside surface of one of the components.

3. Device according to claim 2 characterized in that said ports open into an annular groove (48) on the inside face of said ring, said groove communicating with holes (50) through the component on which said ring is mounted after fixing thereof to the aforementioned outside surface of that component.

4. Device according to claim 1 characterized in that at least one port is defined in an end-piece (55) welded to the end of one or other of the aforementioned two components, said end-piece being attached in such fashion that said port communicates with a corresponding hole (56) in the wall of said component.

5. A fuel distribution device for feeding a plurality of cylinders of a fuel-injected internal combustion engine, said device having a hollow body with a plurality of ports (14, 114) formed in its wall adapted to be connected to a supply of fuel under pressure and to a plurality of injectors feeding the respective plurality of cylinders, said hollow body comprising at least two components (15, 16–115, 116) assembled together to define a cavity (17, 117) between them, wherein the cavity is at least substantially spherical and each of the plurality of ports comprises a substantially radially oriented small section hole (38, 118) and a larger diameter screwthreaded hole (40, 119) opening to the outside and connected to said small section hole, and wherein said components define a substantially spherical cavity between them.

6. Device according to claim 1 characterized in that, for at least one of the aforementioned ports, said screwthreaded hole and the corresponding small section hole are aligned and are connected by a flat or conical bearing surface.

7. Device according to claim 1 characterized in that said components (15, 16) are brazed or otherwise welded together.

8. Device according to claim 1 characterized in that said ring (45) is brazed or otherwise welded on.

9. Device according to claim 3 characterized in that each end-piece (55) is brazed or otherwise welded on.

10. A fuel distribution device for feeding a plurality of cylinders of a fuel-injected internal combustion engine, said device having a hollow body with a plurality of ports (14, 114) formed in its wall adapted to be connected to a supply of fuel under pressure and to a plurality of injectors feeding the respective plurality of cylinders, said hollow body comprising at least two components (15, 16–115, 116) assembled together to define a cavity (17, 117) between them, wherein the cavity is at least substantially spherical and each of the plurality of ports comprises a substantially radially oriented small section hole (38, 118) and a larger diameter screwthreaded hole (40, 119) opening to the outside and connected to said small section hole, and wherein the inside wall of a first of the at least two components (15, 115) forms a first spherical dome (22, 122) extended by a cylindrical sleeve (23, 123) that is open prior to assembly and a second of the at least two components includes a cylindrical plug engaged after assembly in said cylindrical sleeve and having a cup at its inside end forming a second spherical dome (28, 128) complementary to the first spherical dome (22, 122).

11. Device according to claim 1 characterized in that said second component includes a mounting base (36, 136).

12. Device according to claim 11 characterized in that said base (36, 136) includes an annular flange projecting externally relative to said cylindrical plug and in that the flange is welded to a corresponding annular area of said first component surrounding the opening of said sleeve.

13. A fuel distribution device for feeding a plurality of cylinders of a fuel-injected internal combustion engine, said device having a hollow body with a plurality of ports (14, 114) formed in its wall adapted to be connected to a supply of fuel under pressure and to a plurality of injectors feeding the respective plurality of cylinders, said hollow body comprising at least two components (15, 16–115, 116) assembled together to define a cavity (17, 117) between them, wherein the cavity is at least substantially spherical and each of the plurality of ports comprises a substantially radially oriented small section hole (38, 118) and a larger diameter screwthreaded hole (40, 119) opening to the outside and connected to said small section hole, said fuel distribution device further includes an annular recess (146) between the at least two components in a vicinity of a welded area of the plurality of ports and at least one of the at least two components.

14. Device according to claim 12 characterized in that said annular recess (146) is defined by an annular groove in said cylindrical plug (126) in the vicinity of said flange.

15. Device according to claim 10 characterized in that the aforementioned ports (114) are arranged over at least the greater part of said first component (115) and substantially equidistant from each other.

16. Device according to claim 10 characterized in that the aforementioned ports (114) are distributed along an arcuate increased thickness portion (150) of said first component.

17. Device according to claim 10 characterized in that the aforementioned ports (114, 114c) are distributed along a ring-shape increased thickness portion (150c) of said first component (115c).

18. Device according to claim 16 characterized in that it includes at least one radial port (114) and the small section hole and screwthreaded hole are aligned.

19. Device according to claim 16 characterized in that it includes at least one port comprising said radially oriented small section hole (118b, 118c) and a screwthreaded hole (119b, 119c) perpendicular thereto.

20. Device according to claim 1 characterized in that the two components (115, 116) that constitute it are made of aluminum or aluminum alloy.

21. Device according to claim 1 characterized in that the internal orifices of the small section holes (118) are burnished.

22. A fuel distribution device for feeding a plurality of cylinders of a fuel-injected internal combustion engine, said device having a hollow body with a plurality of ports (14, 114) formed in its wall adapted to be connected to a supply of fuel under pressure and to a plurality of injectors feeding the respective plurality of cylinders, said hollow body comprising at least two components (15, 16–115, 116) assembled together to define a cavity (17, 117) between them, wherein the cavity is at least substantially spherical and each of the plurality of ports comprises a substantially radially oriented small section hole (38, 118) and a larger diameter screwthreaded hole (40, 119) opening to the outside and connected to said small section hole, and wherein a first of the at least two components includes a mounting base (36, 136), said mounting base (36, 136) comprises an annular flange projecting externally relative to a cylindrical plug and the annular flange is welded to a corresponding annular area of a second of the at least two components surrounding an opening of a sleeve of the second of the at least two components.

23. A fuel distribution device according to claim 22, wherein an annular recess (146) is defined by an annular groove in said cylindrical plug (126) in the vicinity of said annular flange.

* * * * *